Aug. 29, 1950
J. MARCO
2,520,807
MANUFACTURE OF BASIC CHOCOLATE LIQUOR
Filed April 4, 1947
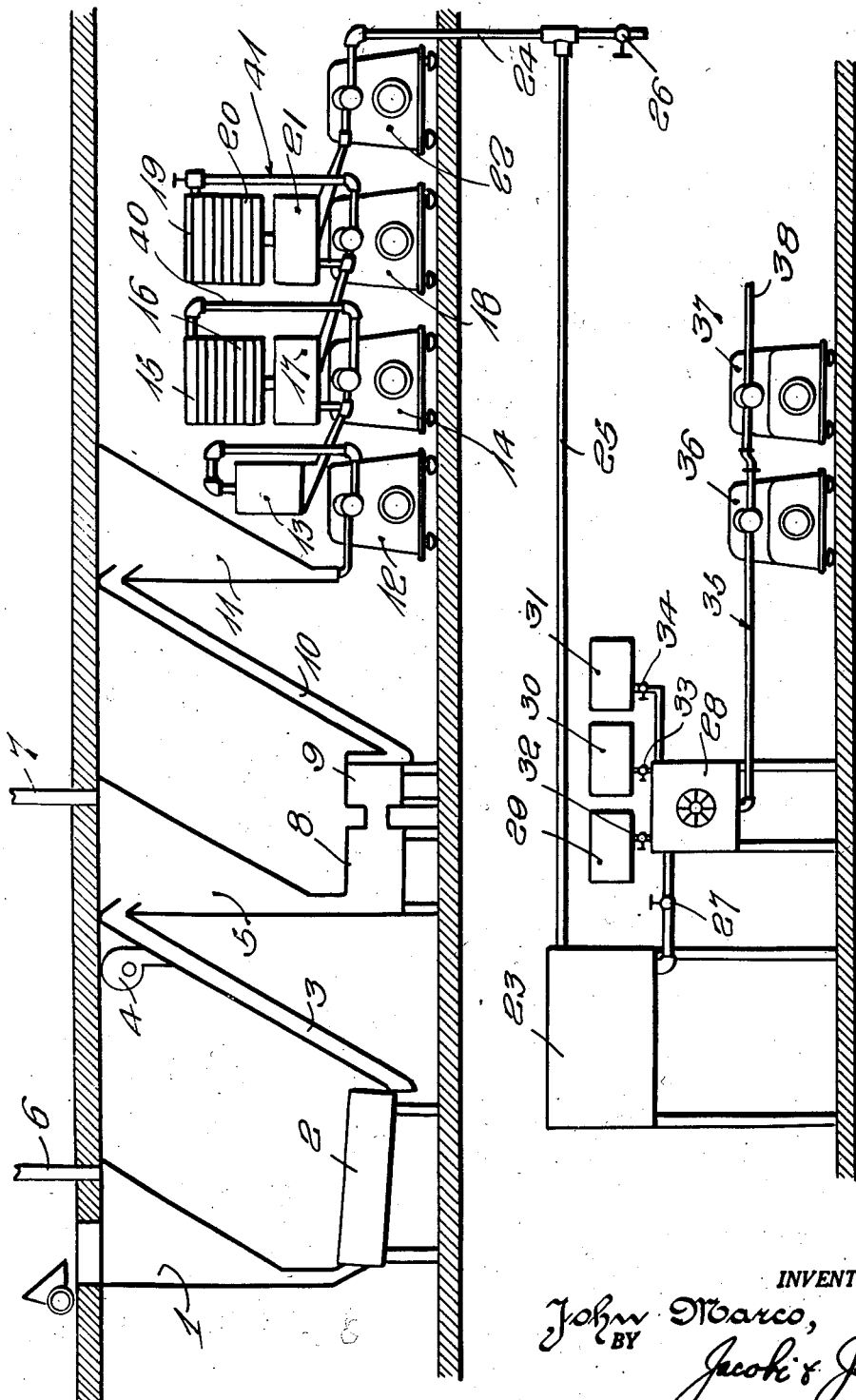
INVENTOR.
John Marco,
BY Jacoki & Jacoki
ATTORNEYS Patented Aug. 29, 1950

2,520,807

UNITED STATES PATENT OFFICE 2,520,807

MANUFACTURE OF BASIC CHOCOLATE LIQUOR

John Marco, Wilmington, Del., assignor to Marco Company, Inc., Wilmington, Del., a corporation of Pennsylvania Application April 4, 1947, Serial No. 739,507

5 Claims. (Cl. 99—23)

My invention relates to a new and novel process for the conversion of the cocoa bean by a continuous process into the basic chocolate in the fluid state, commonly called "chocolate liquor."

It is an object of my invention to provide for the extraction or elimination therefrom of the cocoa butter and other severable elements contained in the chocolate liquor.

It is an object of my invention to carry out the conversion of the chocolate nib at temperatures adequate to accomplish the pasteurization thereof, and in closed circuits to prevent contamination after pasteurization.

It is an object of my invention to eliminate the undesirable gases contained in the cocoa bean, and/or nib, including, but without restriction thereto, the acrid gases thereof.

It is also an object of my invention to produce a compact unit requiring a comparatively small amount of time and energy to the end that the cost and time of processing is substantially reduced.

It is also an object of my invention to eliminate substantial quantities of machinery presently employed for the milling and refining of the cocoa bean, and/or nib, including, but without restriction thereto, the treatment thereof by conches and melangeurs, which consume up to 110 hours.

Other objects and advantages of my invention over the present processes will be revealed in the detailed description of my continuous process, and the schematic drawing of my connected continuous process equipment.

In the drawing, I have shown one schematic elevational view of my associated and connected equipment for carrying into execution my novel continuous process for the production of basic chocolate liquor. The drawing is merely illustrative and not definitive of my invention.

The reference characters identify the parts in both the drawing and the specification.

In the drawing, the hopper, or bin, 1 receives the raw cocoa beans which are guided to a continuous roaster 2 of any suitable variety. During the continuous roasting stage the roasted beans advance through the roaster, and by means of the fan-cooled, closed conveyor duct 3 to the bin 5, the fan being designated by the numeral 4. The bins or hoppers 1 and 5 are provided with vents 6 and 7 to provide for the escape of acrid gases, etc.

From the bin 5, the material is fed into the bean cracker 8 and thence into the fanner 9, both of which may be of the type or types commonly or conventionally used in the chocolate industry. At this stage of the process, substantially all of the nib has been removed from the shell of the bean, and said nib is then conveyed by the conveyor duct 10 to the hopper 11, from which it is fed directly into the first grinder or homogenizer 12, which is preferably of the type illustrated in my Patent No. 2,321,609 dated June 15, 1943, at which point the first stage of grinding of the cocoa nib takes place. The nib, thus ground, is forced into a receiving tank 13 at which point the first stage in the removal of undesirable gases, particularly acrid gases, takes place. This receiving tank 13 may be of any desired or suitable material for the handling of chocolate, but it is preferably of a stainless material to avoid contamination.

From this receiving tank 13, the product is directed to a second grinder or homogenizer 14, at which point it undergoes a second stage of grinding, being further subjected to frictional and/or other heat, both from that accumulated from the grinder proper and that which may be applied to the grinder.

From the grinder 14, the product is then fed over a cooler and aerator 15 and 16, respectively, from which it is directed to a receiving tank 17. The coolers and receiving tanks throughout the apparatus while capable of being formed of any desired material are preferably made of stainless metal.

From the receiving tank 17, the product is fed into a third grinder or homogenizer 18, similar to the grinders 12 and 14, where it undergoes a further stage of grinding and subjection to frictional and/or other heat. From this grinder 18, the product is fed by means of a pipe 41 into the cooler and aerator 19 and 20, respectively, from which the product is directed to the receiving tank 21. Leaving the tank 21, the product proceeds to another grinder or homogenizer 22 where it is further ground, the accumulated heat being further increased by friction and/or additional heat transferred. It may be here stated that the coolers and aerators used throughout this installation may be cooled or heated through refrigerant or heating media, tap-water normally being considered an adequate coolant for the process.

It may be here emphasized that as the cocoa liquor leaves the receiving tanks 17 and 21, the grinders 18 and 22 are regulated to pull under vacuum the chocolate liquor in excess to that which is fed thereinto by the previous machine which effects a starvation of vortexing, there being some air pulled into the grinder which becomes heated to a temperature in excess of flash pasteurization requirements. As the liquor passes over the cooler and aerator it speeds up the extraction of the gases, since the air has been initimately associated with the acetic and other acrid gases while undergoing the grinding stages within the grinder heads. By means of this succession of heating and cooling processes, the objectionable gases and/or volatile acids, and in particular the acrid gases, are effectively expelled from the product. Normally, a difference of 10° is sufficient to accomplish the expulsion of the acids, but a greater or lesser differential may be used as desired.

Leaving the grinder 22, the product is directed through the closed conduits 24 and 25 to a closed receiving tank 23, from which point said basic chocolate liquor may be drawn, as desired, for use in the production and manufacture of various finished and completed chocolate products constituting additional articles of manufacture for use and sale, such as confections, etc. It is contemplated that the basic chocolate liquor will be a very important article of manufacture for use and sale. For the production of final chocolate products, I have disclosed means whereby the basic chocolate liquor may be conveyed by a proportioning pump 27 into the mixer 28. In this mixer, there may also be fed other components of the desired formulae, including, but not restricting thereto, sugar, cocoa butter and milk solids.

There are also provided the tanks 29, 30 and 31 which may be preferred to as dispensing receptacles, which connect respectively with the mixer 28 by means of the proportioning devices 32, 33 and 34, which may be either proportioning pumps or dry proportioners. The fluid components within the mixer 28 are pumped from the dispensing receptacles by means of proportioning pumps, while the dry components are transferred by a dry proportioner. The exact construction of said proportioning devices is immaterial for the purpose of this application.

The component parts which are thus fed into the mixer undergo a preliminary stage of mixing therein. While reference has been made to certain component parts of chocolate normally used, it is appreciated that any formulae desired may be used, thereby presenting to the industry a process which may be used to accomplish any desired combination of materials to cover the full range of chocolate making.

After the mixed product leaves the mixing chamber 28, the same continues through a closed circuit through a mingler or worm-feed 35 to the grinder rolling head 36, which head forces the product between a multiple of rollers, thereby fracturing and subdividing the sugar and milk solids and other material and accomplishing a further stage of refinement of the solid components of the product.

Under the present method of refining chocolate through a multiple roller mill, the product becomes subdivided under the pressure line at the point where the rollers abut each other and since the atmospheric pressure is equal on both sides and the clearance between the abutting rotors is uniform, grinding of the material can now be assured. Furthermore, in the present day method a substantial proportion of the cocoa butter can be squeezed out even though it is of a continuous phase. but in my process employing the aforesaid hydraulic rolling head, the chocolate and other products are fed on one side of the roller through hydraulic force, and the product is in a continuous state of agitation, thus effecting an homogeneous clearing of the solids within the vehicular phase of the product. It is found by employing this method the solid range, when passing through the rollers and reaching atmospheric pressure zone, eliminates obliterations, and the surface of each article is thoroughly coated with the vehicle.

The product, as it leaves the hydraulic rolling head 36 is directed to another grinder or homogenizer 37, which is equipped with a stator and rotor head, such as illustrated in Patent No. 2,321,609, excepting that the two stators, one stationary and one floating, are provided with jackets so that a refrigerant or coolant may there be pumped through the elements so as to effect a tempering of the finished chocolate. A further homogeneous mixing takes place at this point and the temperature of the product may be controlled to suit any type of formulae or blend, to effect the desired snap and retard blooming. From the grinder unit 37, the product may be directed through the pipe 38 to enrobers, casting machines, etc., (not shown) or to any other devices or uses, as desired. It may also be noted that by means of the outlet 26 surplus cocoa liquor may be directed to storage tanks or for other uses, as desired.

It will also be noted that pipes 40 and 41 are provided respectively between cooler 15 and grinder 14 and cooler 19 and grinder 18, and from these pipes connections (not shown) may be made so that a portion of the cocoa butter may be extracted from the product during the grinding stages by means of ejectors.

It will be seen from the foregoing description that by means of this process that within a comparatively small area, with a comparatively few pieces of equipment, and within a minimum period of time, the cocoa nibs may be converted into any form of cocoa liquor, cocoa, chocolate and/or its by-products, all in a continuous process. Thus, a large plant and quantities of equipment normally used for processing of chocolate and chocalate products are eliminated. It will be further seen that through this process, closed circuits are used and the elements of contact with atmosphere is also eliminated, thus preventing contamination of the highly hydroscopic product. The exposure to the air is permitted only at those times when the temperature is sufficiently high as to prevent bacterial contamination. Furthermore, it will be seen that this process provides for the complete pasteurization of the product with the removal of the objectional gases, including acrid gases, and particularly will this be true when stainless steel equipment is used. Furthermore, the use of this particular apparatus as described will avoid objectionable metallic flavors.

From the foregoing, it will be seen that I have provided a comparatively simple, inexpensive and efficient means for carrying out the various objects of the invention. While I have described a particular apparatus most desirable to accomplish the best results, it will be understood that I am not restricted to this particular apparatus in carrying forward the improved method of accomplishment.

Having thus described my invention, what I claim is:

1. The manufacture of basic chocolate liquor comprising a continuous progressive series of steps as follows: Taking raw cacao seed and subjecting them to a continuous roasting stage, collecting and simultaneously cooling the roasted seeds while expelling some of the acrid gases from the roasted seeds, cracking the roasted seed and fanning the cracked seed to simultaneously further cool the seed and remove the shells and more of the acrid gases from the cracked seed, transferring the cracked roasted seed and grinding the same, collecting the ground seed and transferring and subjecting the same to an homogenizing treatment, again collecting the treated seed product and transferring it to an air cooling treatment and thereby remove still more of the acrid gases therefrom, again transferring and subjecting the treated seed product to a further homogenization, then collecting and heat-treating the material to maintain the same in a range of temperatures required for the pasteurization of the treated material, said temperatures being maintained throughout, at least, the major portion of the whole process and simultaneously removing still more of the acrid gases by circulating air, finally again homogenizing the treated seed product to a highly refined condition and transferring the same to a storage tank, thereby eliminating the process steps involved by the use of conches and melanguers, whereby a high quality refined basic chocolate liquor is produced in a minimum of time.

2. The manufacture of basic chocolate liquor, said manufacture comprising a continuous process, said process comprising the following steps: subjecting raw cacao seed to a continuous roasting stage, collecting and simultaneously cooling the roasted seed while expelling some of the acrid gases from the roasted seed, cracking the roasted seed and fanning the cracked seed to simultaneously further cool the seed and separate the shells therefrom, transferring the roasted seed and grinding the same, collecting the ground seed and removing some more of the acrid gases therefrom while transferring the collected ground seed and then subjecting the seed to a homogenizing treatment, heating the homogenized material to a range of temperature required to produce pasteurization, transferring and air cooling simultaneously thereby removing from the material more of the acrid gases, subjecting the homogenized material to a second homogenization treatment, heating the treated material to a range of temperatures required for pasteurization, transferring the heated material and subjecting it to a third homogenization treatment, and finally collecting the homogenized material as chocolate liquor produced by the foregoing continuous process thereby eliminating the process steps required by the use of conches and melanguers.

3. The manufacture of basic chocolate liquor, said manufacture comprising a continuous process for the conversion of raw cacao seed into a basic chocolate liquor in a high state of refinement, said process comprising subjecting raw cacao seed to treatment by roasting, then collecting, transferring and cooling simultaneously as well as eliminating some of the acrid gases from the roasted seed, cracking the roasted seed, then fanning the cracked seed to remove the shells and more acrid gases therefrom, transferring the naked cracked seed and subjecting it to a grinding operation, collecting, transferring and expelling some more of the acrid gases, now subjecting the ground seed to a homogenizing process, collecting, heating to a range of temperatures required for pasteurization, transferring the homogenized material and subjecting it to a second homogenization, now cooling the treated material to a range of temperatures required for pasteurization of the material, transferring and subjecting the treated material to a third homogenization and refining operation and collecting the refined product and conducting it to a storage tank thereby eliminating the process steps required by the use of conches and melanguers.

4. The process set forth in claim 2, in which the temperature of the material being treated is maintained throughout, at least, a major portion of the whole continuous process, within a range of temperatures required for pasteurization whereby fermentation may be eliminated and the flavor and native qualities of the chocolate preserved thereby producing a high quality of refined basic chocolate liquor in a minimum of time.

5. The process set forth in claim 3, in which a range of temperatures required for pasteurization are maintained, at least, throughout the major portion of the whole process to retard fermentation of the chocolate liquor and also preserve its nature flavor and its food qualities thereby producing an excellent quality of refined basic chocolate liquor in a minimum period of time.

JOHN MARCO.

REFERENCES CITED

The following references are of record in the file of this patent:

UNITED STATES PATENTS

| Number | Name | Date |
| --- | --- | --- |
| 1,495,624 | West | May 27, 1924 |
| 1,591,979 | Iff | July 23, 1926 |
| 1,973,778 | Price | Sept. 18, 1934 |
| 2,023,741 | Moir | Dec. 10, 1935 |
| 2,147,549 | Roselius | Feb. 14, 1939 |
| 2,278,483 | Plews | Apr. 7, 1942 |
| 2,356,181 | Rubens | Aug. 22, 1944 |

OTHER REFERENCES

"Chemistry Flavouring and Manufacturing of Chocolate," by Jensen, 1931, p. 113.

"Cocoa and Chocolate," by Whymper, 1912, p. 122.